(12) United States Patent
Matsui et al.

(10) Patent No.: US 6,518,773 B1
(45) Date of Patent: Feb. 11, 2003

(54) SENSOR SENSITIVITY ADJUSTING APPARATUS

(75) Inventors: Kazuhito Matsui, Aichi-ken (JP); Yasushi Nishibe, Aichi-ken (JP); Katsuya Kogiso, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/649,206

(22) Filed: Aug. 28, 2000

(30) Foreign Application Priority Data

Aug. 31, 1999 (JP) .............................................. 11-245585

(51) Int. Cl.⁷ .............................................. G01N 25/56
(52) U.S. Cl. .................................... 324/609; 73/335.02
(58) Field of Search .............................. 324/609, 696, 324/647, 656; 73/335.02

(56) References Cited

U.S. PATENT DOCUMENTS 4,379,406 A * 4/1983 Bennewitz et al. ...... 73/335.02
5,818,225 A * 10/1998 Mickley et al. ............. 324/251

* cited by examiner

*Primary Examiner*—Christine Oda
*Assistant Examiner*—Vincent Q. Nguyen
(74) *Attorney, Agent, or Firm*—Robert D. Buyan; Stout, Uxa, Buyan & Mullins, LLP

(57) ABSTRACT

A compact and inexpensive sensor sensitivity adjusting apparatus. The sensor sensitivity adjusting apparatus includes a sensor, a current supplying IC and a variable resistor. The current supplying IC has first and second fixed resistors connected in series between two terminals of a power supply, and an operational amplifier. The sensitivity of the sensor changes in accordance with the value of a drive current. The drive current is adjusted by changing the resistance of the variable resistor.

3 Claims, 2 Drawing Sheets

SENSOR SENSITIVITY ADJUSTING APPARATUS

BACKGROUND OF THE INVENTION

The present invention relates to a sensor sensitivity adjusting apparatus.

There are two conventional methods of adjusting the sensitivity of a sensor device: one using constant-current driving and the other using constant-voltage driving. The constant-current drive system controls the sensitivity of a sensor by adjusting the current that flows through the sensor. The constant-voltage drive system controls the sensor sensitivity by adjusting the voltage that is applied to the sensor.

FIG. 1 is a schematic block diagram of a conventional sensor sensitivity adjusting apparatus which adjusts the sensitivity of a sensor based on the constant-current drive system. A fixed resistor R11 and a variable resistor R12 divide the supply voltage to produce a reference voltage V1. The reference voltage V1 is applied to the plus terminal of an operational amplifier 12. The current I1 that flows in a sensor 11 is controlled by adjusting the resistance of the variable resistor R12. The current I1 that flows in the sensor 11 is defined by a fixed resistor R13, which has a stable temperature characteristic.

A detection signal from the sensor 11 is amplified by an amplifier circuit 13, and the amplified detection signal (output 14) is input to an unillustrated control circuit. The control circuit performs various controls in accordance with the detection signal from the sensor 11.

It is essential that the fixed resistor R11 and the variable resistor R12 in the conventional sensor sensitivity adjusting apparatus have approximately the same resistance ratio and approximately the same temperature characteristic. If the temperature characteristics of the two resistors R11 and R12 differ from each other, the reference voltage V1 shifts from the desired value when the temperature changes. This changes the value of the current I1, causing the sensitivity of the sensor 11 to deviate from the desired sensitivity. It is therefore troublesome to select a usable fixed resistor R11 and variable resistor R12.

Many components (five in FIG. 1), such as the fixed resistor R11, the variable resistor R12, the fixed resistor R13, the operational amplifier 12 and the amplifier circuit 13, are provided on a printed circuit board. The printed circuit board is relatively large and the attachment of these components is tiresome, thus leading to a relatively high manufacturing cost.

SUMMARY OF THE INVENTION

Accordingly, it is an object of the present invention to provide a compact sensor sensitivity adjusting apparatus having fewer components.

To achieve the above object, the present invention provides an apparatus for adjusting a sensitivity of a sensor. The apparatus includes a sensor, a current supplying circuit, a voltage applying element, and a current defining element. The sensor is activated when supplied with a predetermined drive current. The sensitivity of the sensor is changed in accordance with a value of the drive current. The current supplying circuit is connected to the sensor and supplies the drive current to the sensor based on a reference voltage. The voltage applying element has a plurality of fixed resistors, which are connected to the current supplying circuit. The voltage applying element generates the reference voltage applied to the current supplying circuit. The current defining element has a variable resistor, which is connected to the current supplying circuit and the sensor. The current defining element defines a value of a current flowing in the sensor. A sensor voltage approximately equal in a value to the reference voltage is applied to the current defining element.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
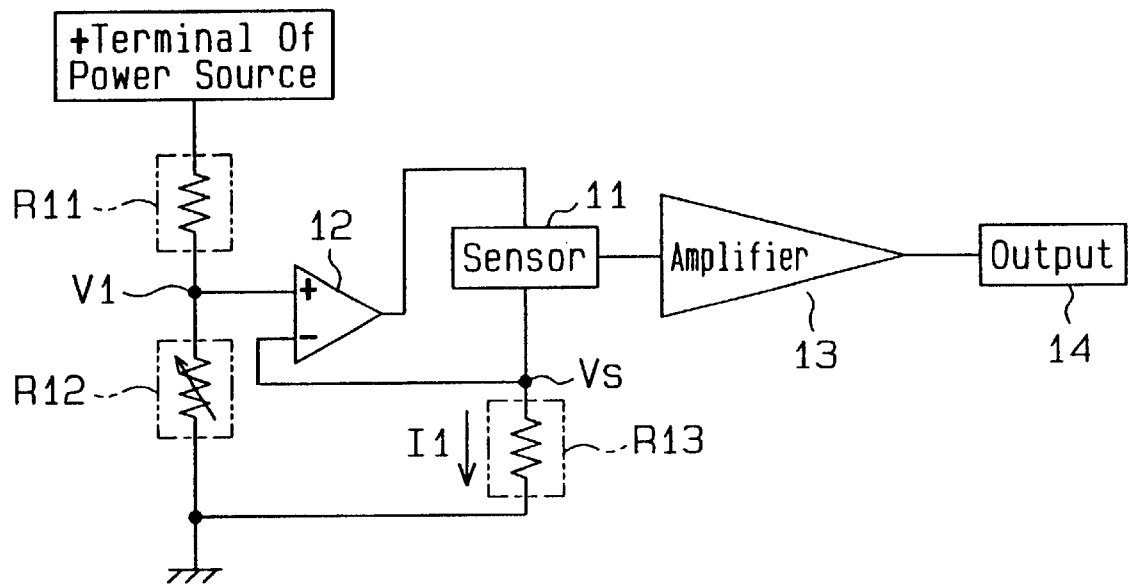
FIG. 1 is a schematic circuit diagram of a conventional sensor sensitivity adjusting apparatus.
Figure 2:
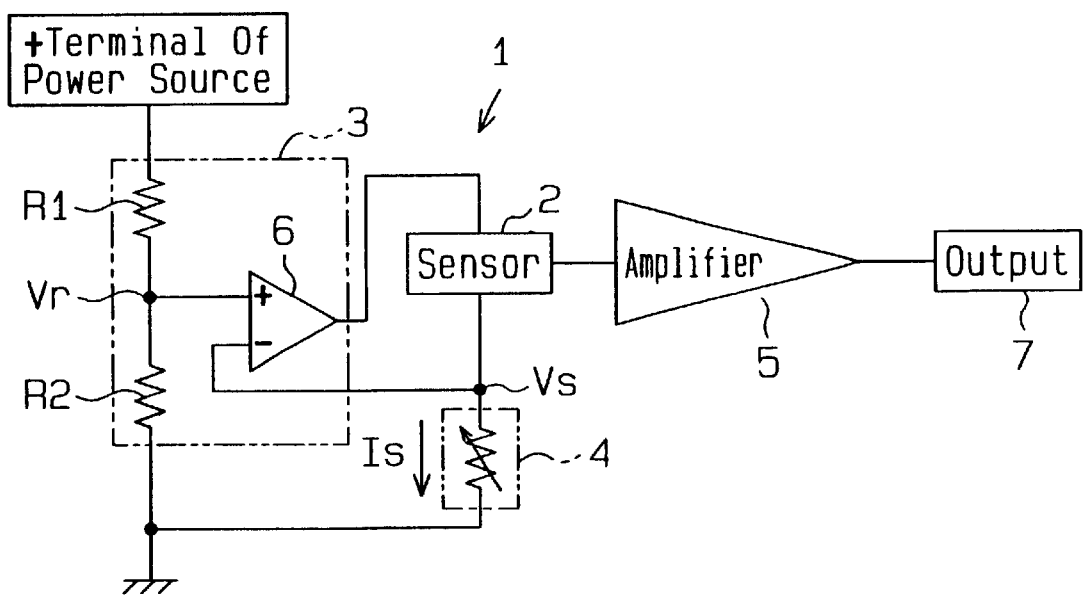
FIG. 2 is a schematic circuit diagram of a sensor sensitivity adjusting apparatus according to a first embodiment of this invention.

A sensor sensitivity adjusting apparatus 1 according to a first embodiment of the present invention will now be described referring to FIG. 2. The sensor sensitivity adjusting apparatus 1 controls the driving and the sensitivity of a sensor 2 using a constant current. The sensor sensitivity adjusting apparatus 1 has the sensor 2, a current supplying IC 3, a variable resistor element 4 and an amplifier circuit 5 (e.g., an operational amplifier). The IC 3 incorporates an operational amplifier 6, a first fixed resistor R1 and a second fixed resistor R2. That is, the operational amplifier 6 and the first and second fixed resistors R1 and R2 are packaged (as a unit) in the IC 3. The variable resistor element 4 is a chip resistor.

The first and second fixed resistors R1 and R2 are placed in series between the plus terminal and minus terminal (the ground in FIG. 2) of a power supply. The variable resistor element 4, which serves as a current defining element, is placed between one terminal of the power supply and the sensor 2. The operational amplifier 6, which serves as a current supplying element, has its plus input terminal connected to a node between the first fixed resistor R1 and the second fixed resistor R2. The minus input terminal of the operational amplifier 6 is connected to a node between the variable resistor element 4 and the sensor 2. The output terminal of the operational amplifier 6 is connected to the sensor 2.

The output terminal of the sensor 2 is connected to the input terminal of the amplifier circuit 5, so that a detection signal from the sensor 2 is supplied to the amplifier circuit 5. The output terminal of the amplifier circuit 5 may be connected to an unillustrated control circuit. The amplifier circuit 5 amplifies the detection signal of the sensor 2 and supplies the amplified detection signal (output 7) to the control circuit. The control circuit operates in accordance with the amplified detection signal 7. The ratio of the resistance of the first fixed resistor R1 to the resistance of the second fixed resistor R2 is constant. The first and second fixed resistors R1 and R2 serve as a voltage applying element.

A description will now be given of the method of adjusting the sensitivity of the sensor 2 that is carried out by the sensor sensitivity adjusting apparatus 1.

Basically, the operational amplifier 6 defines the sensitivity of the sensor 2. The variable resistor element 4 adjusts the sensitivity within a predetermined range.

The supply voltage or the voltage between the plus terminal and the minus terminal is divided by the first and second fixed resistors R1 and R2, thus producing a reference voltage Vr. The reference voltage Vr is applied to the plus terminal of the operational amplifier 6. It is known that the potential at the plus terminal of the operational amplifier 6 and the potential at the minus terminal thereof are nearly equal to each other. That is, a voltage Vs (sensor voltage) whose value is approximately equal to the reference voltage Vr is applied to the minus terminal of the operational amplifier 6.

When the voltage Vs is applied to the minus terminal of the operational amplifier 6, the value of the current Is that flows across the variable resistor element 4 is expressed by the following equation.

*Is*=Sensor voltage *Vs*/resistance of variable resistor element 4.

The current that flows through the sensor 2 has the same level as that of the current Is flowing across the variable resistor element 4. That is, the sensor 2 is driven by the current Is (drive current). The value of the drive current Is is changed in accordance with the resistance of the variable resistor element 4. The sensitivity of the sensor 2 is adjusted by adjusting the resistance of the variable resistor element 4.

The resistance of the variable resistor element 4 is preset to a predetermined value so as to produce the drive current Is that optimizes the sensitivity of the sensor 2. It is preferable that the variable resistor element 4 has a stable temperature characteristic.

The sensor 2 is driven by the drive current Is supplied thereto. When detecting a target subject, the sensor 2 sends its detection signal to the amplifier circuit 5. The detection signal is amplified by the amplifier circuit 5 and the unillustrated control circuit executes various controls based on the amplified detection signal (output 7).

The first embodiment has the following advantages.

(1) As the operational amplifier 6 and two fixed resistors R1 and R2 are incorporated in the IC 3, the sensor sensitivity adjusting apparatus 1 according to the first embodiment has fewer components than the conventional sensor sensitivity adjusting apparatus that has separate components. This makes the sensor sensitivity adjusting apparatus 1 compact and reduces the manufacturing cost.

(2) The reference voltage Vr is determined by the first and second fixed resistors R1 and R2. The drive current Is of the sensor 2 is determined by the voltage Vs nearly equal to the reference voltage Vr and the resistance of the variable resistor element 4. The sensitivity of the sensor 2 is determined in accordance with the value of the drive current Is. In other words, adjusting the resistance of the variable resistor element 4 adjusts the sensitivity of the sensor 2. Therefore, the two fixed resistors R1 and R2 can be built into the IC 3. In this case, it is desirable that at least the resistance ratio should be constant.

The first embodiment may be modified as follows.

Figure 3:
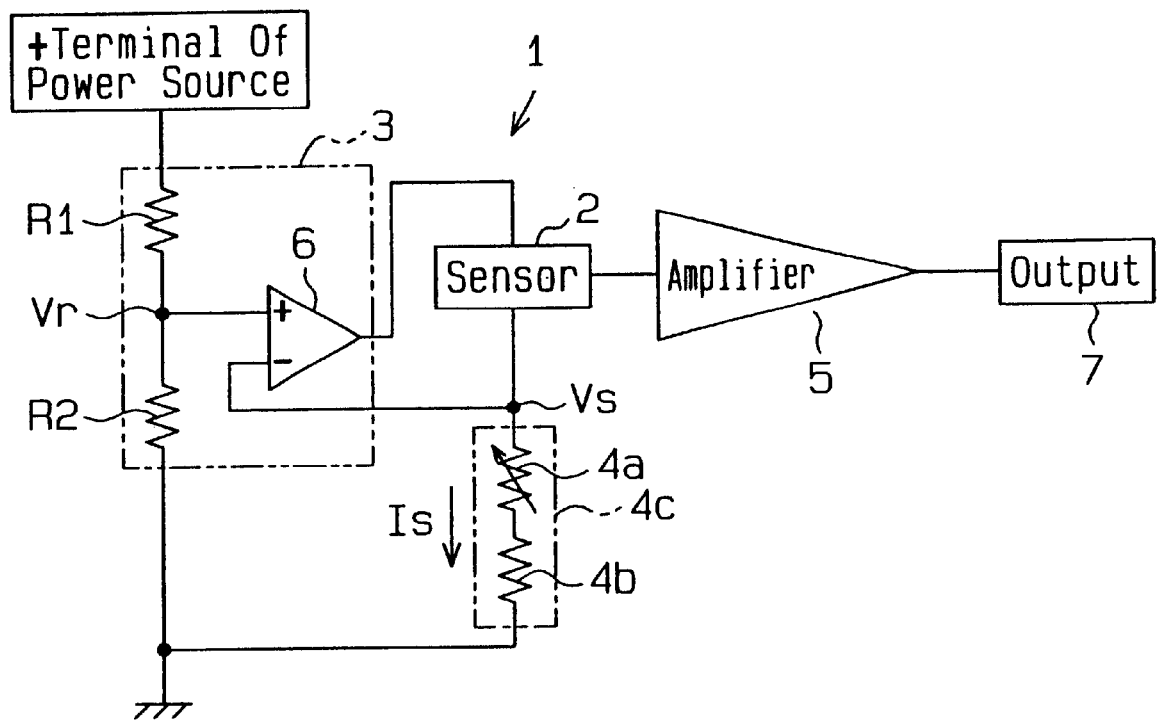
FIG. 3 is a diagram showing a modification of the first embodiment.

As shown in FIG. 3, a current defining element 4c, which has a variable resistor 4a and a third fixed resistor 4b connected in series may be used in place of a single variable resistor element 4. In this case, the sensitivity of the sensor 2 is adjusted to the lowest level by minimizing the resistance of the variable resistor 4a. The minimum level is determined by the resistance of the third fixed resistor 4b. The sensitivity that is equal to or higher than the minimum level can be adjusted by the variable resistor 4a. Therefore, the variable resistor 4a which has a narrow adjustment range can be used to adjust the sensitivity of the sensor 2. In general, the precision of the variable resistor which has a narrow adjustment range is higher than the precision of the variable resistor which has a wide adjustment range. In this modification, therefore, the sensitivity of the sensor 2 is adjusted more accurately.

The third fixed resistor 4b may be incorporated together with the operational amplifier 6 and the first and second fixed resistors R1 and R2 in the IC 3.

The number of fixed resistors (R1 and R2) as a voltage applying element may be increased to three or more. The fixed resistors are also incorporated into the IC 3 in this case.

The IC 3 may incorporate the amplifier circuit 5 in addition to the operational amplifier 6 and the first and second fixed resistors R1 and R2. In this case, the components mounted on the printed circuit board are the IC 3 and the variable resistor element 4, thus further reducing the number of components on the printed circuit board. This makes the sensor sensitivity adjusting apparatus 1 more compact and further lowers the manufacturing cost.

In place of the chip resistor, a thin film resistor may be used as the variable resistor element 4.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An apparatus for adjusting a sensitivity of a sensor, comprising:

a sensor that is activated when supplied with a predetermined drive current, the sensor including a sensor input terminal receiving the drive current and a sensor output terminal emitting a sensor current, wherein the sensor has a variable sensitivity dependent on a value of the drive current;

first and second fixed resistors connected in series between a high potential power source and a low potential power source, wherein a node voltage at a first node between the first and second resistors defines a reference voltage;

a single operational amplifier having a first input terminal connected to the first node, a second input terminal, and an output terminal connected to the sensor input terminal for supplying the drive current;

a variable resistor connected between the sensor output and the low potential power source; and a second node directly coupling the sensor output terminal to the second input terminal and the variable resistor, wherein a node voltage at the second node defines a sensor voltage, the variable resistor varying the sensor current to maintain the sensor voltage at a value approximately equal to the reference voltage.

2. The apparatus according to claim 1, wherein the first and second fixed resistors are packaged together with the operational amplifier in an integrated circuit.

3. The apparatus according to claim 1, wherein the variable resistor is connected to the sensor output terminal and the second input terminal of the operational amplifier at the second node.

* * * * *